United States Patent [19]
Baum

[11] 3,972,708
[45] Aug. 3, 1976

[54] PROCESS FOR AVOIDING FORMATION OF SMOKE AND FLAMES IN BOTTOM BLOWN CONVERTERS

[75] Inventor: Kurt Baum, Essen, Germany

[73] Assignee: Verfahrenstechnik Dr.-Ing. Kurt Baum, Essen, Germany

[22] Filed: Sept. 11, 1974

[21] Appl. No.: 505,020

[30] Foreign Application Priority Data
Sept. 13, 1973  Germany............................ 2346087

[52] U.S. Cl......................................... 75/60; 75/59
[51] Int. Cl.²............................................ C21C 5/34
[58] Field of Search................................. 75/59, 60

[56] References Cited
UNITED STATES PATENTS
3,843,354  10/1974  Nilles..................................... 75/59
3,844,769  10/1974  Calderon............................... 75/60
3,856,510  12/1974  Nilles..................................... 75/60

Primary Examiner—Peter D. Rosenberg
Attorney, Agent, or Firm—Charles E. Baxley

[57] ABSTRACT

This disclosure teaches a process for avoiding formation of smoke and flames in bottom blown converters upon charging of scrap and pig iron, deslagging and casting. Inert gas, preferably nitrogen, is blown into the converter vessel through bottom tuyeres both during introduction of the scrap and pig iron in a tipped position of the vessel and in the vessels erected position.

3 Claims, 2 Drawing Figures

PROCESS FOR AVOIDING FORMATION OF SMOKE AND FLAMES IN BOTTOM BLOWN CONVERTERS

BACKGROUND OF INVENTION

The present invention relates to a process for avoiding formation of smoke and flames in bottom blown converters upon charging of pig iron and scrap, deslagging and casting.

In addition to optimum collecting of reaction gases during actual blowing periods, it is essential in bottom blown oxygen crucibles to avoid formation of smoke and flames, occurring upon charging of ingredient materials, as well as escape of smoke and flames into the furnace room.

For solving this problem, the most favorable conditions are present in bottom blown oxygen crucibles, in contradistinction to opinions previously held by experts in this art.

In the process for refining pig iron in a bottom blown converter in which pure oxygen and a nitrogen free blanket gas are blown into molten pig iron by tuyeres, it is already known to preheat the scrap also by introduction of oxygen and hydrocarbons. For this purpose there are used the same tuyeres in one half of the converter bottom which then also act on the scrap in the lower tuyere free half of the converter. These tuyeres for the serving of one half of the converter bottom can be protected from melting, upon the introduction of the liquid pig iron with the converter horizontal, by introduction of an inert gas.

The present invention solves the overall problem of eliminating the generally substantial formation of smoke and flames by blowing inert gas (for instance nitrogen) in through the bottom tuyeres upon the charging of the scrap and, insofar as gases and vapors remain, preventing their emergence into the furnace room as well as the occurrence of red iron smoke upon the following pouring in of the pig iron.

BRIEF STATEMENT OF INVENTION

The new process is based on discoveries described below, with the effects explained immediately thereafter.

Instead of air as previously customary in the so-called basic Bessemer converter, nitrogen as an inert gas is blown for a short time through the oxygen tuyeres in order to prevent clogging of the tuyeres in the bottom, primarily during the entire charging steps, while the converter is in its tipped position. In this way primarily any combustion of the oily and combustible components of the scrap and thus any increase in temperature as well as any oxidation of the carbon in the liquid pig iron is avoided. Therefore formation of neither flames nor smoke can occur in this stage.

In order to draw off the quantities of inert gas which are very small, in contradistinction to the traditional basic Bessemer operation by means of air, there is used a relatively small secondary dust collecting hood in accordance with German Pat. application P 22 33 443.6-24.

The largest portion of the development of flames and smoke took place normally upon introduction of the liquid pig iron onto the cold scrap, whereby explosive development and smoke occurred.

In accordance with the new process, immediately after the introduction of the scrap in the manner described, the scrap is first heated with the converter vertical in blowing position using the oxygen tuyeres as well as fuel from the inert gas blanket (i.e. the hydrocarbon containing gases or vapors) with increased feeding of the latter and approximately stoichiometric combustion thereof. The oil and/or other burnable impurities adhering to the scrap also serve as fuel in this connection. The resultant combustion gases are withdrawn via the main gas flue for the reaction gases of the actual blowing period and any dust or smoke removed therefrom in the following wet cleaning which is not required at this stage of the operating cycle. This is particularly effective when using oily scrap or baled scrap.

In a brief heating period of 1 to 2 minutes, the scrap is thereby heated to a temperature of 900 – 1000°C, this manner of operation simultaneously permitting a substantially high scrap rate and thus being able to provide a further not insignificant economic advantage.

The sensitive heat in the waste gas and/or the impurities therein which is obtained upon heating up of the scrap can be discharged directly through the existing cooling stack and the removal of the dust taken over by a subsequent wet scrubbing system.

After the heating up of the scrap, it is so to say dedusted upon striking the liquid pig iron and the nitrogen fed already upon the tipping process prevents the otherwise customary smoke annoyance.

This manner of operation does not result either in additional cost of investments, nor in any substantial additional operating expense for carrying out these measures.

One essential feature of the invention furthermore resides in the fact that the switching of the streams of gas is in each case controlled mechanically and automatically as follows:

a. Upon each tipping, the flow of oxygen is replaced by $N_2$, taking place each time in the tipped position, i.e. during the placing of the converter into horizontal or vertical position. The same applies also in the case of sudden interruptions in operation.

b. In the blowing position, only the feeding of oxygen and blanket gas in the required ratio is possible.

c. In the case of the heating up of the scrap, the ratio of the heating gas (otherwise blanket gas) to oxygen is adjusted for a correspondingly short period of time manually.

The invention therefore consists in a process for avoiding formation of smoke and flames in bottom blown converters in the manner that during the introduction of scrap as well as molten pig iron in the tipped position and upon erecting, inert gas (for instance nitrogen) is automatically blown in through the bottom tuyeres.

Another improvement resides in the fact that the cold scrap is heated through the bottom tuyeres by means of hydrocarbon gas and oxygen in counter current to 900°C or higher and thus cleaned, while upon the tipping over, inert gas is blown in and there is prevented occurrence of iron smoke by carbon combustion in the melt in this phase. It is advantageous in this connection that the small quantities of off-gas obtained in the tipped position be withdrawn by means of a secondary dust removal hood.

It is furthermore essential that the pivoting of the converter into its tipped position and its subsequent pivoting into vertical position automatically controls the inward flow of the gases acting in each case.

BRIEF DESCRIPTION OF DRAWINGS

One suitable embodiment of the new process is shown schematically in FIGS. 1 and 2 of the drawings.

DESCRIPTION OF PREFERRED EMBODIMENT

Figure 1:
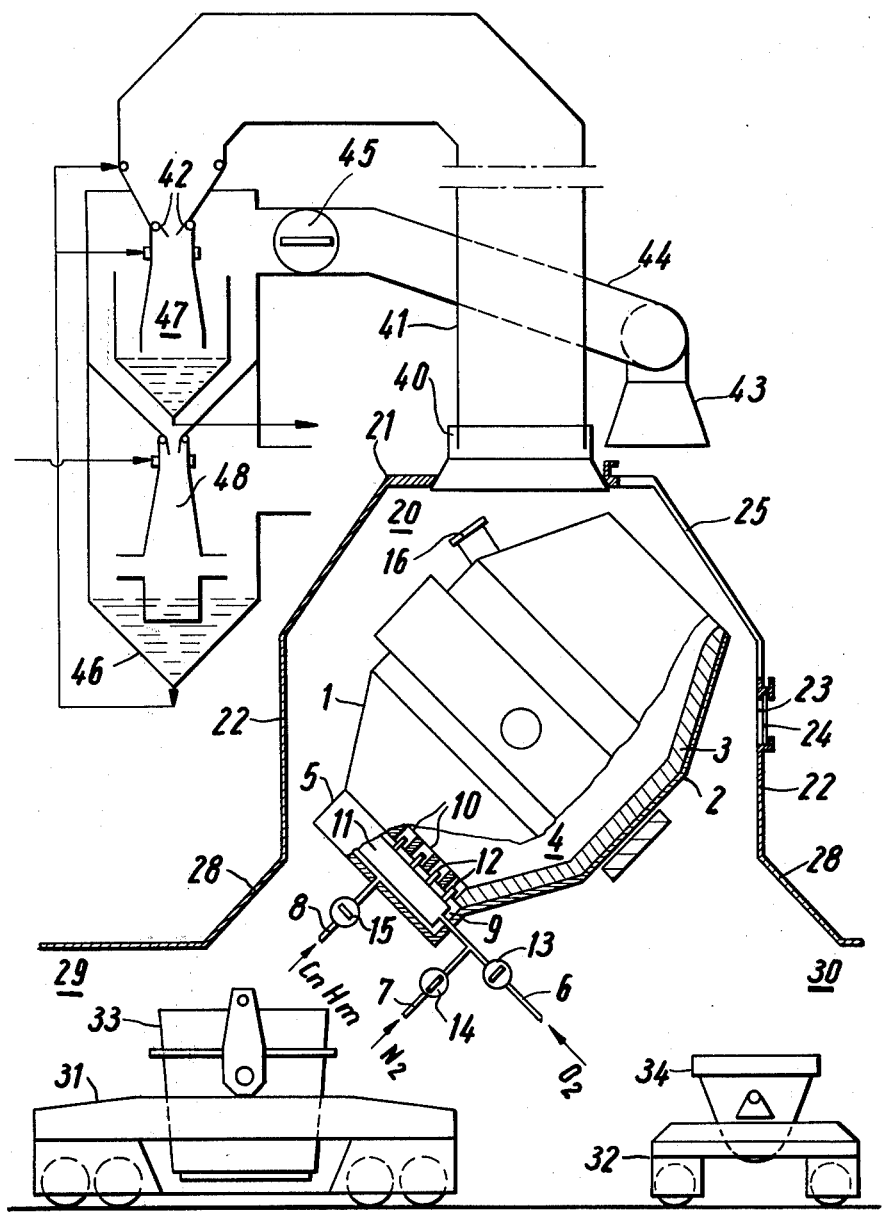
FIG. 1 shows a converter in its tipped position for introduction of scrap and pig iron, and it also shows the lining of the converter and the subsequent gas cleaning system. The switching of the gas to the converter bottom required for this and the corresponding position of the control members for controlling the quantities of gas to be drawn off by the main and secondary exhaust systems is also shown.
Figure 2:
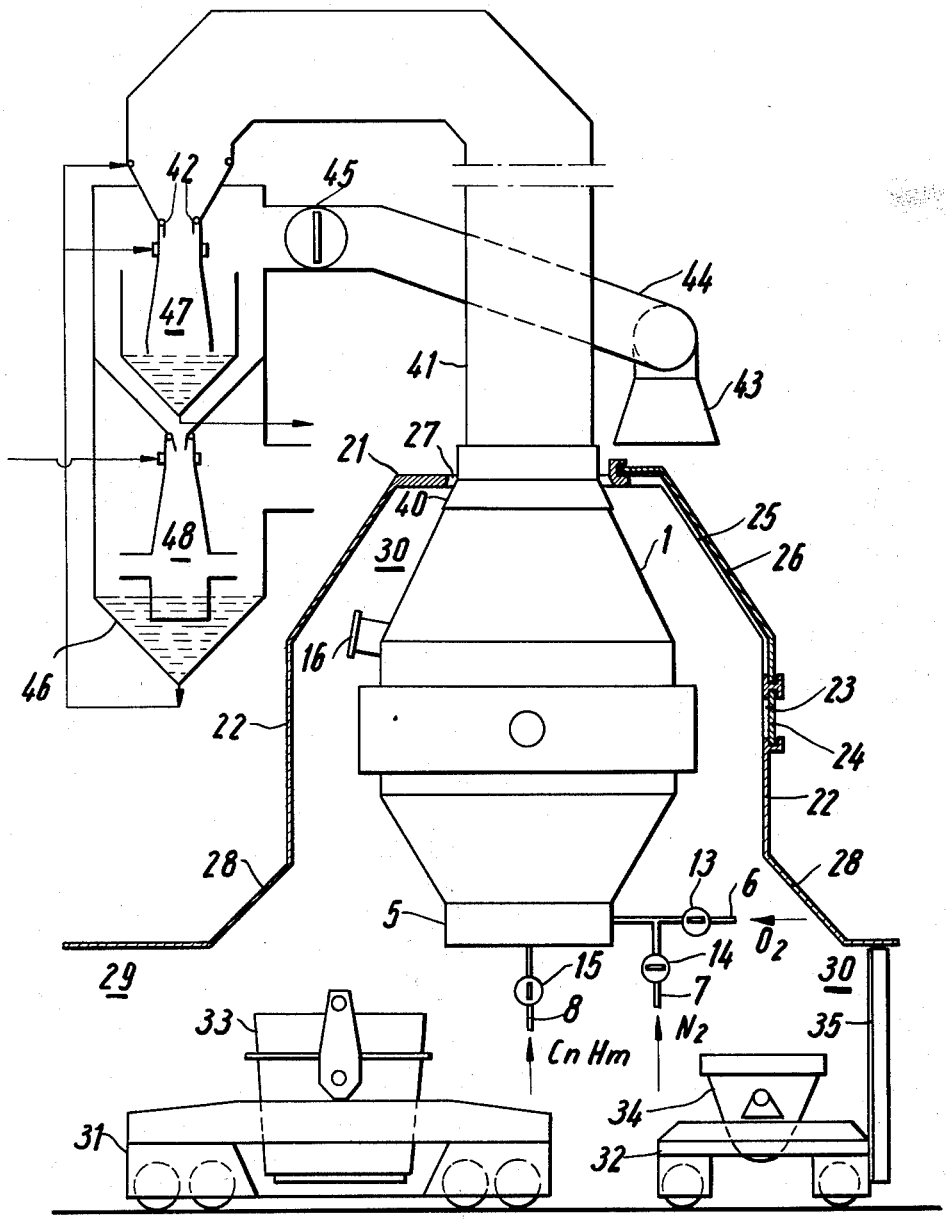
FIG. 2 is a corresponding diagram for the erect position of the converter.

The following structure of the plant and of the course of the process can be noted in detail from the drawings:

In FIGS. 1 and 2, a bottom blown converter vessel 1 is shown. The vessel 1 is open at its top end and it consists of a metal shell 2 and a refractory lining 3. At a lower end 5 of the vessel 1 there is shown schematically some connecting lines 6, 7 and 8 for feeding of different gases. As can be noted from FIG. 1, selectively composed quantities of inert nitrogen or combustion gases (CnHm) are fed via the feedlines 8 and 7 to a first collecting space 9 and tuyeres 10 to the inside 4 of the converter vessel 1. The introduction of oxygen takes place via a line 6, a second collecting space 11 and second tuyere openings 12. The connecting line 7 for the feeding of the inert gas is one of those customary for blowing in of oxygen and therefore passes within the bottom 5 into the collecting space 11. The lines 6—8 are provided with control valves 13—15 by which flow of the gases be automatically controlled by the turning movements of the vessel 1.

The vessel 1 is arranged, in accordance with German Pat. application No. P 22 33 443.6-24, in a chamber 20 and is provided with a main exhaust system 40, 41, as well as an additional exhaust system 43, 44. The limiting walls 21, 22 of the chamber 20 are so arranged that they surround the vessel as closely as possible but do not interfere with the different operating processes and the turning movements of the converter necessary for this.

Through the access openings 29 and 30, trucks 31,32 having tapping ladle 33 and slag ladle 34 can be brought as required below the vessel 1. It is advisable during the casting and deslagging process to close at least one of the entrance openings 29 and 30. As shown in FIG. 2, this is done, for instance, by a device 35 arranged on the slag truck 34 which seals the righthand entrance opening 30. The cross section of the lefthand entrance opening 29 should then be so dimensioned that with the full suction of the blower and the entrance openings 23, 25 and 30 to the chamber 20 closed, a draft of preferably 2 to 8 m/sec is established. Adjoining the lateral limiting walls 22 of the chamber 20 in the region of the entrance openings 29 and 30 there are provided the oblique walls 28. The oblique walls 28 should preferably form an angle of 45° to 60° with the horizontal in order, upon the casting and deslagging, to afford favorable conditions of flow for the air drawn in through the channel 29 and for dust laden gases arising by thermal upward flow from the pig iron ladle 33 and slag ladle 34.

For measurement of temperature and sampling there is provided in the lateral limiting wall 22 of the chamber 20 an access opening 23 which when not used in closed by a door 24. Above this there is another access opening 25 having a door 26 which is opened only upon the introduction of scrap and pig iron. An annular opening 27 in the wall 21 of the chamber 20 is only present when the converter is in heating position, the reaction gases, as known from experience, being completely taken up here by the main exhaust system 40, 41. As can clearly be noted from FIG. 1, before the introduction and casting, the gas collecting hood 40 of the main exhaust system must be raised in order to permit the necessary turning movements for the vessel 1. The annular gap 27 (shown in FIG. 2) is thereby automatically closed.

Above the access openings 25 there is provided the additional exhaust system 43, 44 which serves to take up the dust laden gases upon the introduction of scrap and pig iron. As shown in FIG. 1, gas and smoke are picked up by the downward directed draft of the hood 43 and flow via the conduit 44 and the shutoff device 45 directly into the fine scrubbing stage 48 of the wet scrubbing system 46, not described in further detail. This path of the stream of gas from the supplementary exhaust system makes it possible, upon the turning of the converter for filling and simultaneously with the opening of the shutoff device 45, to reduce the cross section of the Venturi throat of the precleaning stage 47 by means of rotatable flaps 42 and thus throttle the suction through the main suction system. In this connection, about 20% of the flow of gas should preferably still flow through the main suction system. This is sufficient for good flushing of the main suction system, whereby gas pockets which might lead to explosions and detonations are avoided.

It will be apparent to those skilled in operation of converters that various deviations may be made from the shown embodiment without departing from a main theme of invention set forth in claims which follow.

I claim:

1. In a pig iron refining process carried out in a converter having bottom tuyeres, the converter being pivotable between a tipped position and an erect position; a method for avoiding formation of smoke and flames; the method comprising steps as follows:
    a. automatically blowing inert gas through the tuyeres into the converter while pivoting the converter from the erect position to the tipped position;
    b. continuing the blowing of inert gas while introducing scrap and pig iron into the converter;
    c. automatically switching to blowing of oxygen and hydrocarbon gas and regulating substantially stoichiometric proportions while pivoting the converter to the erect position;
    d. automatically switching to blowing of inert gas while pivoting the converter to the tipped position and further blowing thereof during the introduction of scrap and molten pig iron and pivoting the converter to the erect position;
    e. automatically switching the blowing of oxygen and hydrocarbon gas as soon as the erect position is reached;
    f. repeating switching to blowing of inert gas after finishing the blowing of step (e) and pivoting the converter into a position suitable for deslaging and pouring of steel;
    g. controlling the blowing the steps (a), (b), (c), (d), (e) and (f) by the pivoting of the converter.

2. The method according to claim 1 and further characterized by the fact that the scrap initially at ambient temperature is heated to a temperature of at least 900°C by blowing a hydrocarbon gas and oxygen through the bottom tuyeres, hot flue gases being discharged from the converter and then being cooled and cleaned and passed to the atmosphere whereupon the inert gas is blown into the converter in the tipped position in order to prevent occurrence of iron smoke.

3. The method according to claim 2 and further characterized by the fact that off gases produced in the converter in the tipped position are drawn off via a secondary dust removal hood and are thereupon cleaned.

* * * * *